United States Patent
Adachi et al.

(10) Patent No.: US 6,259,395 B1
(45) Date of Patent: Jul. 10, 2001

(54) RELATIVE VELOCITY DETECTING APPARATUS FOR AUTOMOTIVE VEHICLE

(75) Inventors: Kazutaka Adachi, Yokohama; Takenori Hashizume; Hideo Iwamoto, both of Kanagawa, all of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/434,368

(22) Filed: Nov. 5, 1999

(30) Foreign Application Priority Data

Nov. 10, 1998 (JP) .................................................. 10-318913

(51) Int. Cl.$^7$ ...................................................... G01S 13/93
(52) U.S. Cl. .............................. 342/70; 340/903; 701/96; 342/71
(58) Field of Search .................................. 342/70, 71, 72, 342/455, 456; 340/903; 701/93, 96; 180/169, 170

(56) References Cited

U.S. PATENT DOCUMENTS

| | | | |
|---|---|---|---|
| 4,628,317 | * 12/1986 | Nishikawa et al. | 340/903 |
| 5,162,794 | * 11/1992 | Seith | 340/903 |
| 5,710,565 | 1/1998 | Shirai et al. | 342/70 |
| 5,959,572 | * 9/1999 | Higashimata et al. | 342/70 |
| 6,175,799 | * 1/2001 | Tsutsumi et al. | 701/96 |
| 6,188,950 | * 2/2001 | Tsutsumi et al. | 701/96 |

FOREIGN PATENT DOCUMENTS 2 324 283  10/1998  (GB).
6-187599   7/1994  (JP).

* cited by examiner

Primary Examiner—Ian J. Lobo
(74) Attorney, Agent, or Firm—Foley & Lardner (57) ABSTRACT

In a relative velocity detecting apparatus for an automotive vehicle applicable to an automatic vehicular velocity control system to follow up a preceding vehicle, an inter-vehicle distance detector is provided which is disposed on the vehicle so as to be oriented toward a forward detection zone of the vehicle to detect an inter-vehicle distance to the preceding vehicle which is running ahead of the vehicle, to recognize whether the preceding vehicle has entered the forward detection zone and to derive the inter-vehicle distance value lrn (n=1, 2, ..., n) whenever a predetermined period of time has passed when recognizing that the preceding vehicle has entered the forward detection zone, a relative velocity calculator is provided to perform a band pass filter calculation for the inter-vehicle distance value lrn, the band pass filter being expressed as: $CF0 \cdot S/(S^2 + CF1 \cdot S + CF0)$, wherein CF0 and CF1 denote constants, and to calculate a relative velocity value vr of the preceding vehicle to the vehicle according to the above equation, and an initial value setting section is provided to set a first initial value lr0 of the inter-vehicle distance value and a second initial value vr0 of the relative velocity value in the band pass filter calculation by the relative velocity calculator during a run of the vehicle.

8 Claims, 6 Drawing Sheets

RELATIVE VELOCITY DETECTING APPARATUS FOR AUTOMOTIVE VEHICLE

BACKGROUND OF THE INVENTION a) Field of the Invention

The present invention relates to a relative velocity detecting apparatus for an automotive vehicle applicable to an automatic vehicular velocity control system which follows up a preceding vehicle which is running ahead of the vehicle on the same traffic lane if the preceding vehicle appears in a forward detection zone of the vehicle.

b) Description of the Related Art

A Japanese Patent Application First Publication No. Heisei 6-187599 published on Jul. 8, 1994 exemplifies a previously proposed automotive vehicular radar apparatus which determines an inter-vehicle distance from a preceding vehicle to the vehicle using a laser beam radar unit as an inter-vehicle distance sensor.

In the previously proposed relative velocity detecting apparatus, the relative velocity vrn is calculated using a digital differentiation calculation according to the following equation (1) on the basis of inter-vehicle distance detection data dfn-1 and dfn through a predetermined filtering:

$$vrn=(dfn\text{-}1\text{-}dfn)/0.1[m/S] \qquad (1).$$

In the equation (1), 0.1 means a sampling time in seconds.

SUMMARY OF THE INVENTION

However, according to the calculation method of the relative velocity value is not robust to (i.e., easily influenced by or susceptible to) a noise mixed into an inter-vehicle detection signal.

A Japanese Patent Application First Publication No. Heisei 11-59222 published on Mar. 2, 1999 (which corresponds to a U.S. Pat. No. 5,959,572 and corresponds to a British Patent No. GB 2 324 283 B published on Aug. 18, 1999) exemplifies a previously proposed automatic vehicular velocity control system in which the relative velocity is calculated by performing a band pass filtering for the inter-vehicle detection data lr(t). That is to say, the relative velocity vr(t) is calculated according to the following equation using the inter-vehicle distance value lr(t).

$$vr(t)=\omega n^2 \cdot S \cdot lr(t)/(S^2+2\cdot\zeta\cdot\omega n\ S+\omega n^2) \qquad (2).$$

In the equation (2), S denotes a differential operator. The above equation (2) is expressed as a product of a low pass filter $\omega n^2/(S^2+2\cdot\zeta\cdot\omega nS+\omega n^2)$ and a high pass filter of the differetiator of S. The low pass filter eliminates a noise component having a high frequency mixed within the inter-vehicle distance detection value and the differentiator of S calculates the relative velocity vr(t) from the differentiation of the inter-vehicle distance lr(t).

In the previously proposed automatic vehicular velocity control system, no consideration has been given to initial values of the inter-vehicle distance and the relative velocity of the preceding vehicle to the vehicle.

It is an object of the present invention to provide an improved relative velocity detecting apparatus for an automotive vehicle which can accurately detect the relative velocity of the preceding vehicle to the vehicle immediately after an inter-vehicle distance detector sensor has recognized that a preceding vehicle appears in a forward detection zone of the vehicle. The preceding vehicle described above is, for example, another vehicle which has interrupted the forward detection zone of the inter-vehicle distance sensor of the vehicle from another traffic lane and which is running ahead of the vehicle on the same traffic lane of the vehicle, which is present in the forward detection zone when the vehicle is changed to another traffic lane, or which has appeared in the forward detection zone when the vehicle is in a forward run.

The above-described object can be achieved by providing a relative velocity detecting apparatus for an automotive vehicle, comprising: an inter-vehicle distance detector, disposed on the vehicle so as to be oriented toward a forward detection zone of the vehicle to detect an inter-vehicle distance to a preceding vehicle which is running ahead of the vehicle, to recognize whether the preceding vehicle has entered the forward detection zone and to derive the inter-vehicle distance value lrn (n=1, 2, - - - , n) whenever a predetermined period of time has passed when recognizing that the preceding vehicle has entered the forward detection zone; a relative velocity calculator to perform a band pass filter calculation for the inter-vehicle distance value lrn, the band pass filter being expressed as: $CF0 \cdot S/(S^2+CF1 \cdot S+CF0)$, wherein CF0 and CF1 denote constants and S denotes a differential operator, and to calculate a relative velocity value vr of the preceding vehicle to the vehicle according to the above equation; and an initial value setting section to set a first initial value lr0 of the inter-vehicle distance value and a second initial value vr0 of the relative velocity value in the band pass filter calculation by the relative velocity calculator during a run of the vehicle.

The above-described object can also be achieved by providing a relative velocity detecting apparatus for an automotive vehicle, comprising: an inter-vehicle distance detector, disposed on the vehicle so as to be oriented toward a forward detection zone of the vehicle to detect an inter-vehicle distance to a preceding vehicle which is running ahead of the vehicle, to recognize whether the preceding vehicle has entered the forward detection zone and to derive the inter-vehicle distance value lrn (n=1, 2, - - - , n) whenever a predetermined period of time has passed when recognizing that the preceding vehicle has entered the forward detection zone; a relative velocity calculator to perform a band pass filter calculation for the inter-vehicle distance value lrn, the band pass filter being expressed as: $CF0 \cdot S/(S^2+CF1 \cdot S+CF0)$, wherein CF0 and CF1 denote constants and S denotes a differential operator, and to calculate a relative velocity value vr of the preceding vehicle to the vehicle according to the above equation; and an initial value setting section to change a first initial value lr0 of the inter-vehicle distance value from null and to change a second initial value vr0 of the relative velocity value from null in the band pass filter calculation by the relative velocity calculator.

DETAILED DESCRIPTION OF THE PREFERRED EMBODIMENT

Reference will hereinafter be made to the drawings in order to facilitate a better understanding of the present invention.

Figure 1A:
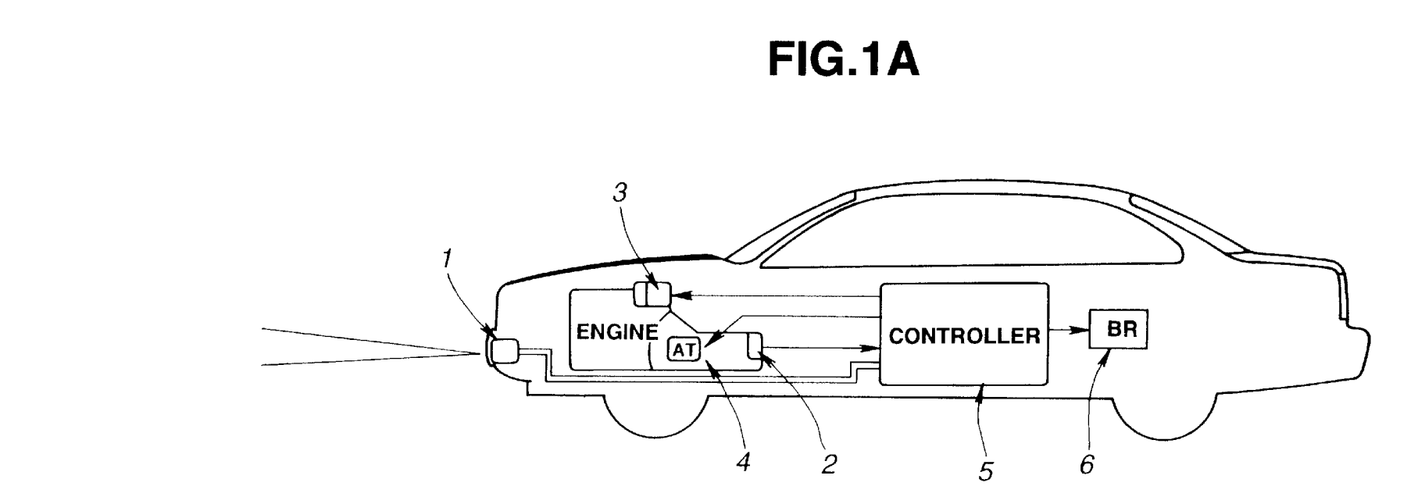
FIG. 1A is a block diagram of an automatic vehicular velocity control apparatus for an automotive vehicle to which a relative velocity detecting apparatus in a preferred embodiment according to the present invention is applicable.

FIG. 1A shows a whole configuration of an automatic vehicular velocity control apparatus to which a relative velocity detecting apparatus in a preferred embodiment according to the present invention is applicable.

In FIG. 1A, an inter-vehicle distance sensor 1 is disposed on a front lower portion of the vehicle to detect an inter-vehicle distance from the vehicle to a preceding vehicle which is running ahead of the vehicle on the same traffic lane as the vehicle.

The inter-vehicle distance sensor 1 is constituted by, for example, a radar unit which emits and scans laser light beams toward a front detection zone and in leftward and rightward directions and receives reflected light beams from an object present in the front detection zone if the object is present.

It is noted that the inter-vehicle distance may be detected utilizing an electromagnetic wave or an ultrasonic wave and the relative velocity may be calculated from the detected result through such a medium as the electromagnetic wave or the ultrasonic wave.

A vehicular velocity sensor 2 detects a revolution velocity of an output axle of a transmission 4 to be converted to a vehicular velocity V.

Figure 1B:
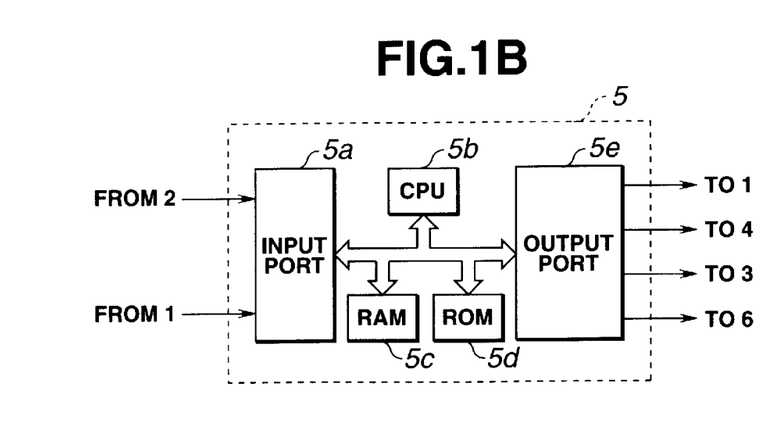
FIG. 1B is a circuit block diagram of a controller shown in FIG. 1A.

A controller 5 (also called, a preceding vehicle follow-up run controller) includes a microcomputer and its peripheral devices. The microcomputer includes, as shown in FIG. 1B, a CPU 5b (Central Processing Unit and specifically a MPU (microprocessor unit)), a RAM 5c (Random Access Memory), a ROM 5d (Read Only Memory), an Input Port 5a, an Output Port 5e, and a common bus.

A vehicular velocity control section 4 calculates at least one or any two or three of a command value to command an engine throttle valve actuator 3 to open an engine throttle valve, a command value to command an automatic brake actuator 6 to generate a braking liquid pressure in a brake system 6 according to its command value, and a command value to command a gear ratio actuator to adjust the gear ratio of the transmission 4 according to its command value.

Although the transmission 4 is an automatic transmission in the embodiment, the transmission 4 may be a continuously variable transmission (CVT). In the case of the continuously variable transmission, the gear ratio means a speed ratio.

Figure 2:
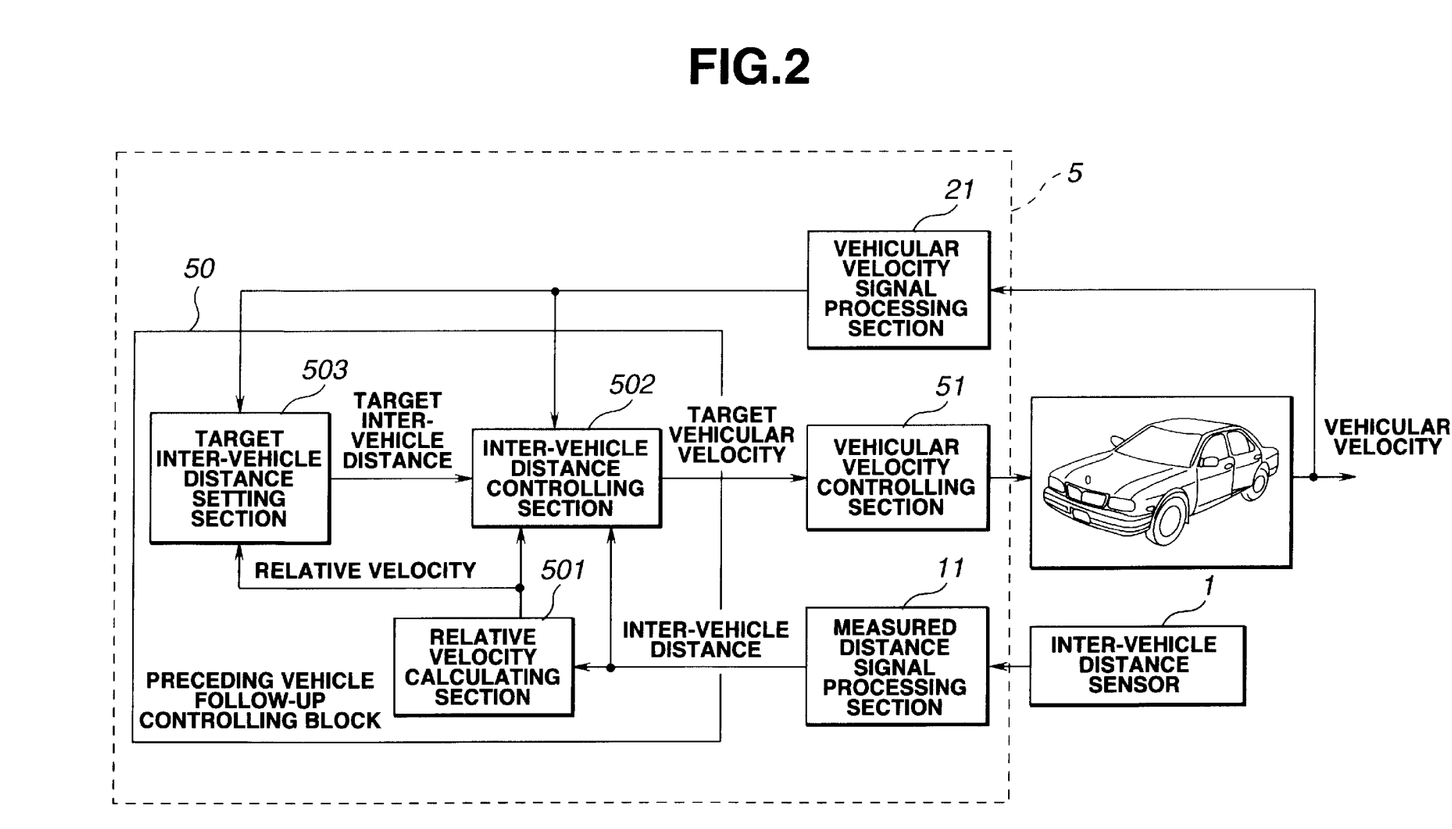
FIG. 2 is a configuration view of a follow-up run controller of the automatic vehicular velocity controlling apparatus to which the relative velocity detecting apparatus in the preferred embodiment is applicable.

FIG. 2 shows a functional block diagram of the automatic vehicular velocity control system to which the relative velocity detecting apparatus in the preferred embodiment according to the present invention is applicable.

In FIG. 2, a measured distance signal processing section 11 of the controller 5 recognizes the object detected in the front detection zone of the vehicle by means of the inter-vehicle distance sensor 1 as the preceding vehicle and measures a time duration from the time at which the laser beams are radiated to the time at which the reflected laser beams from the recognized preceding vehicle are received so as to detect an inter-vehicle distance lr to the preceding vehicle.

It is noted that in a case where a plurality of preceding vehicles are present in the front detection zone, one of the preceding vehicles which is present on the same traffic lane and is located at a closest distance to the vehicle is specified as the preceding vehicle to be followed up by the vehicle. The detailed description of the method for specifying the preceding vehicle will herein be omitted since the preceding vehicle specifying method is exemplified by a U.S. Pat. No. 5,710,565 issued on Jan. 20, 1998,(the disclosure of which is herein incorporated by reference).

The measured distance signal processing section 11 determines that a new preceding vehicle has appeared due to the interruption of the new preceding vehicle in front of the vehicle if the inter-vehicle distance measured value lr is varied by a predetermined distance, for example, five meters or longer for a predetermined period of time, for example, 100 milliseconds and outputs a new preceding vehicle information flg0. A vehicular velocity signal processing section 21 measures the period of pulse signal outputted from the vehicular velocity sensor 2 to measure the vehicular velocity vs of the vehicle.

A preceding vehicle follow-up control section 50 includes a relative velocity calculating section 501, an inter-vehicle distance control section 502, and a target inter-vehicle distance setting section 503.

The preceding vehicle follow-up control block 50 calculates a target inter-vehicle distance $L_T^*$ and a target vehicular velocity $V_S^*$ on the basis of the inter-vehicle distance lr and the vehicular velocity vs. The relative velocity calculating section 501 calculates the relative velocity vr to the preceding vehicle on the basis of the inter-vehicle distance lr detected by the measured distance signal processing section 11 and the new preceding vehicle recognition information flg0. The inter-vehicle distance controlling section 502 calculates a target vehicular velocity vr to make the inter-vehicle distance coincident with the target inter-vehicle distance $L_T^*$. The target inter-vehicle distance setting section 503 sets a target inter-vehicle distance $L_T^*$ in accordance with the vehicular velocity vt of the preceding vehicle or in accordance with the vehicular--velocity vs. The vehicular velocity controlling section 51 controls a vehicular braking or driving force and the gear ratio of the transmission 4 so that the vehicular velocity vs is made equal to the target vehicular velocity $V_S^*$.

It is noted that in a case where the preceding vehicle is not in the front detectable zone of the inter-vehicle distance sensor 1, the preceding vehicle follow-up run control block 50 outputs a vehicular velocity set by a vehicular occupant (a set vehicular velocity) to the vehicular velocity control section 4 as the vehicular velocity command value V* so that the vehicle runs constantly at the set vehicular velocity (cruise run).

It is noted that the automatic vehicular velocity control system to which the relative velocity detecting apparatus in the preferred embodiment is applicable is exemplified by a U.S. Pat. No. 5,959,572 which corresponds to a British Patent No. GB 2 324 283 B published on Aug. 18, 1999. The contents of the U.S. Pat. No. 5,959,5720 identified above is herein incorporated by reference.

Figure 3:
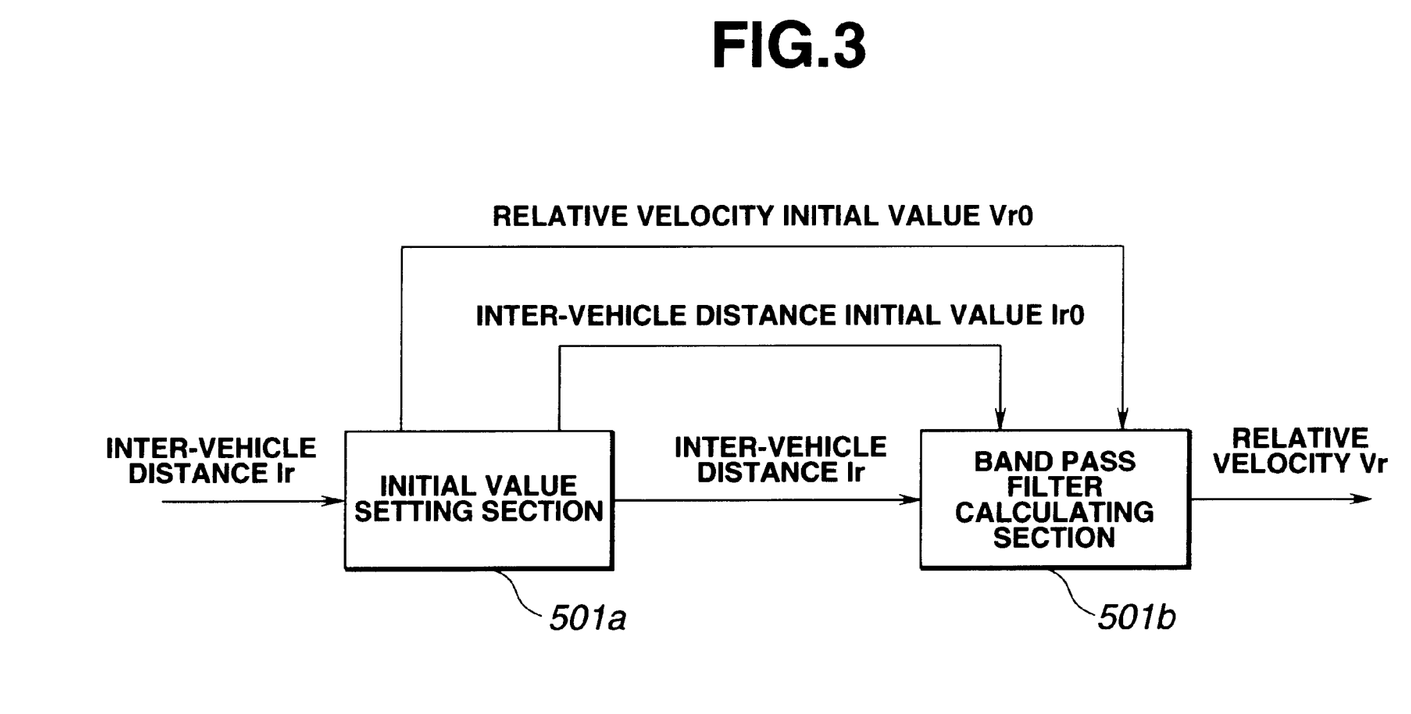
FIG. 3 is an internal configuration of an initial value setting section in a band pass filter calculating section therein.

FIG. 3 shows a block diagram of a structure of the relative velocity calculating section 501.

The relative velocity calculating section 501 includes: an initial value setting section 501a; and a band pass filter calculating section 501b.

The initial value setting section 501a sets an initial value lr0 of the inter-vehicle distance and an initial value vr0 of the relative velocity for the calculation of the band pass filter. The method of setting the initial values will be described later. The band pass filter calculating section 501b calculates the relative velocity vr(t) using the following equation (1A) on the basis of the inter-vehicle distance lr(t) when the new preceding vehicle recognition information flg0 from the measured signal processing block 11.

$$vr(t)=CF0 \cdot S \cdot lr(t)/(S^2+CF1 \cdot S+CF0) \quad (1A).$$

In the equation (1A), CF0 denotes a constant of the band pass filter on the inter-vehicle distance and CF1 denotes a constant of the band pass filter on the relative velocity.

In addition, in the equation (1A), CF0 is equal to $\omega n^2$ in the equation (2), CF1 is equal to $2?\zeta?\omega n$ in the equation (2). For example, $\omega n=2\times\pi\times 0.3$ [Hz] and $\zeta=\sqrt{2}/2 \approx 0.707$.

Figure 4:
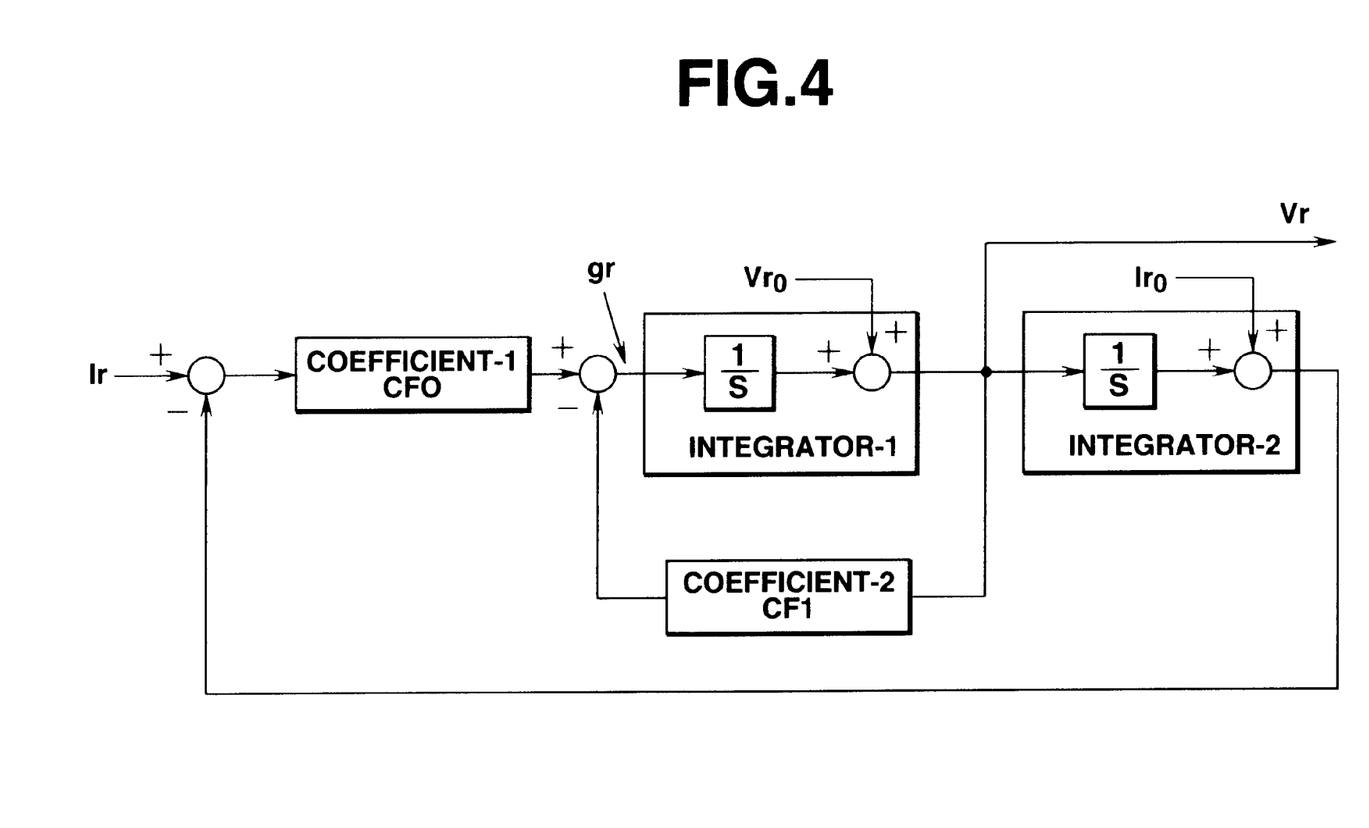
FIG. 4 is a configuration view of a structure in and an initial value setting section and the band pass filer calculating section of the relative velocity calculating section.

FIG. 4 shows a detailed block diagram of the band pass filter (BPF).

The band-pass filter can be expressed in terms of hardware in such a manner that the band pass filter includes a serial circuit of an integrator 1 related to a relative velocity vr and one integrator 2 related to an inter-vehicle distance lr. In FIG. 4, an input gr of the integrator 1 indicates a relative acceleration and is expressed in the following equation (1C).

$$gr(t)=CF0 \cdot lr(t)-CF1 \cdot vr(t)-CF0 \cdot lr(t) \quad (1C).$$

If the relative acceleration gr(t) is integrated, the relative velocity vr(t) is derived as follows:

$$vr(t)=gr(t)dt+vr0 \quad (1D).$$

In the above equation (1D), vr0 is an initial value of the integrator 1 of the band pass filter, namely, an initial value of the relative velocity. Furthermore, if the relative velocity vr(t) is integrated, the inter-vehicle distance lr(t) can be determined.

$$lr(t)=vr(t)dt+lr0 \quad (1E).$$

In the above equation (1E), lr0 is an initial value of the integrator 2 of the band pass filter, namely, the initial value of the inter-vehicle distance.

In the preferred embodiment, if the relative acceleration gr is 0 immediately after the new preceding vehicle has been recognized, both of the initial value vr0 on the relative velocity and the initial value lr0 on the inter-vehicle distance are set by methods as will be described below. It is noted that the inter-vehicle distance data lrn (n=1, 2, - - - n) are outputted from the measured distance signal processing section 11 whenever a predetermined period of time, viz., the sampling time ts has passed.

<First Initial Value Setting Method>

If the CPU of the controller 5 receives the recognition of the new preceding vehicle according to the new preceding vehicle recognition information flg0, the CPU of the controller 5 stores the inter-vehicle distance lr1 into a memory such as the RAM 5c immediately after the new preceding vehicle has been recognized and resets the band pass filter calculation.

When the subsequent inter-vehicle distance lr2 is derived, the CPU of the controller 5 calculates the initial value vr0 of the relative velocity according to the following equation (1F)

$$vr0=(lr2-lr1) \cdot (CF0/CF1) \quad (1F).$$

Suppose that the inter-vehicle distance lr1 immediately after the new preceding vehicle has been recognized is set as the initial value lr0 of the inter-vehicle distance.

The subsequent inter-vehicle distance lr2 is set as the initial input and the band pass filter calculation of the relative velocity vr is started.

<Second Initial Value Setting Method>

If the recognition of the new preceding vehicle is received according to the new recognition of the preceding vehicle, the CPU stores the inter-vehicle distance value lr1 immediately after the new preceding vehicle has been recognized into the memory and resets the band pass filter calculation. If the subsequent inter-vehicle distance lr2 is derived, a relative velocity initial value vr0 is calculated according to a digital differentiation shown in the following equation (1G).

$$vr0=(lr2-lr1)/ts \quad (1G)$$

In the equation (1F), ts denotes a sampling time of the inter-vehicle distance described above. Furthermore, the initial value vr0 on the relative velocity is used to calculate the initial value lr0 on the inter-vehicle distance.

$$lr0=lr2-(CF1/CF0) \cdot vr0 \quad (1H)$$

Thereafter, the band pass filter calculation of the relative velocity vr with the inter-vehicle distance lr2 as the first input.

<Third Initial Value Setting Method>

A third initial value setting method is a combination of the first setting method and the second setting method. That is to say, if the relative velocity is large, namely, an absolute value in a deviation between lr1 and lr2 on the inter-vehicle distance is large, the above-described second method is adopted. If the relative velocity is small, an accuracy of a digital differentiation is worsened so that the first initial value setting method is adopted.

Figure 5:
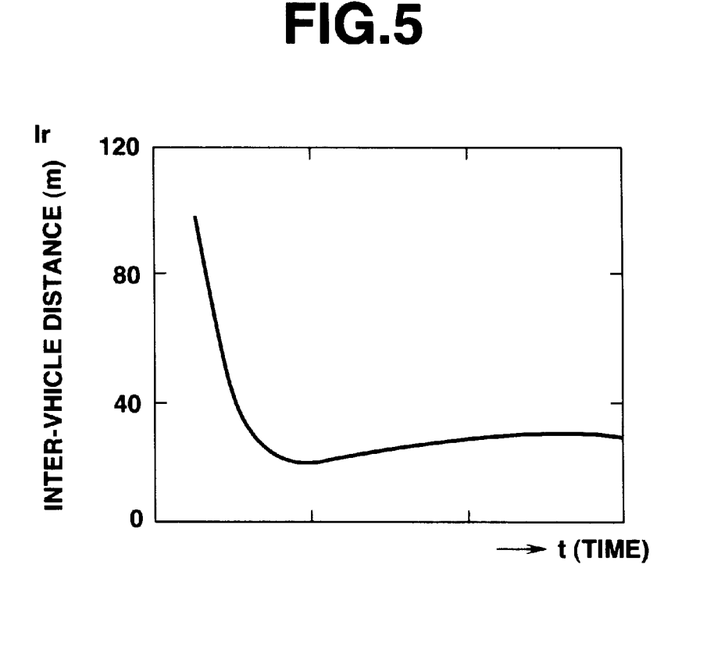
FIG. 5 is a characteristic graph representing a variation in an inter-vehicle distance using the follow up run control.
Figure 6:
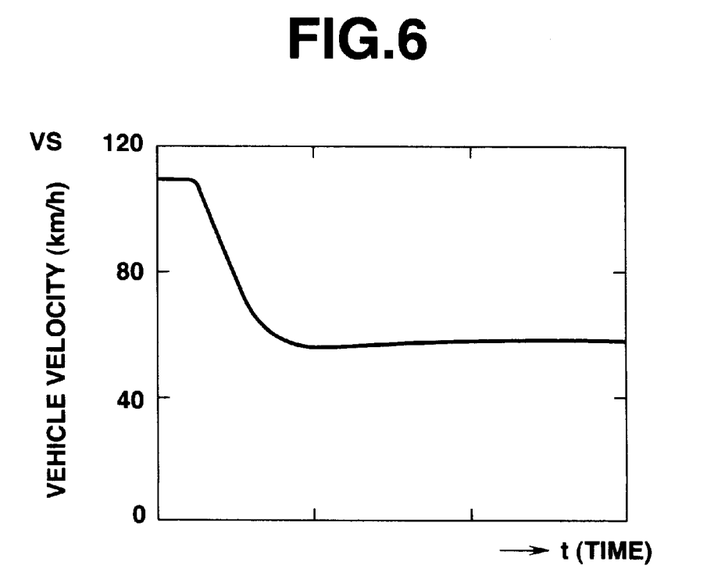
FIG. 6 is a characteristic graph representing a variation in a vehicular velocity calculating section in the relative velocity calculating apparatus.
Figure 7:
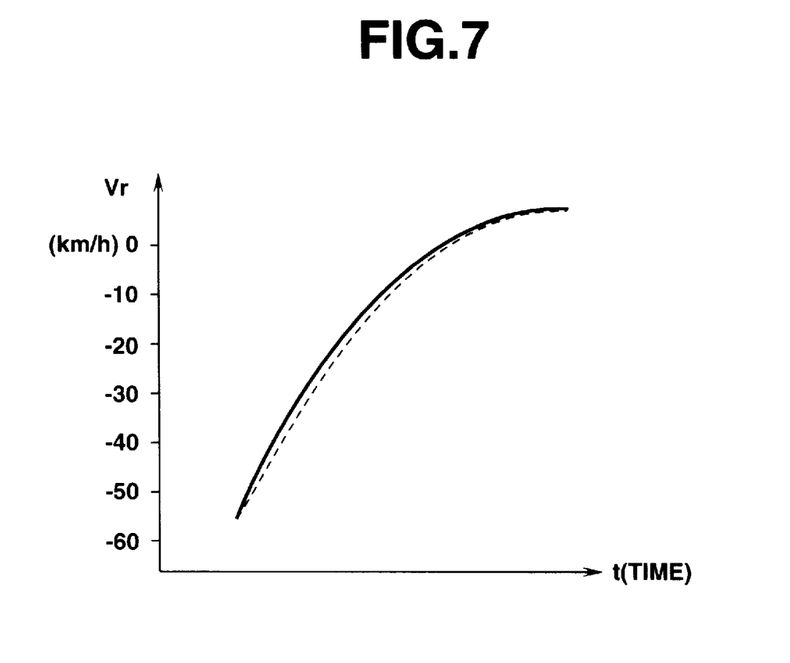
FIG. 7 is a configuration representing a result of calculation by the relative velocity calculating section of the relative velocity detecting apparatus in the preferred embodiment.

FIGS. 5 through 7 show results of calculations in the preferred embodiment. FIG. 5 shows a result of the calculation on an inter-vehicle distance lr. FIG. 6 shows a result of the calculation on an inter-vehicle distance vs. FIG. 7 shows the result of calculation on the relative velocity vr.

In FIG. 7, the solid line denotes an actual relative velocity and a broken line denotes a result of calculation in the embodiment.

If the new preceding vehicle is recognized 100 meters ahead of the vehicle during the vehicular run at the vehicular velocity of 110 Km/h, the relative velocity calculation value (broken line) is varied from the initial value of −55 Km/h to the actual relative velocity (solid line) and the calculation error of the relative velocity is small.

Especially, since the band pass filter calculation is carried out with the initial values vr0 and lr0 of the relative velocity and the inter-vehicle distances correctly set, the band pass filter calculation is carried out so that the error immediately after the new preceding vehicle is recognized is small. Hence, in a case where the calculated relative velocity described in the embodiment is used in the follow-up run control to the preceding vehicle, such an operation delay as the deceleration immediately after the preceding vehicle has been recognized does not occur but a smooth follow-up run control to the new preceding vehicle can be started.

Figure 8:
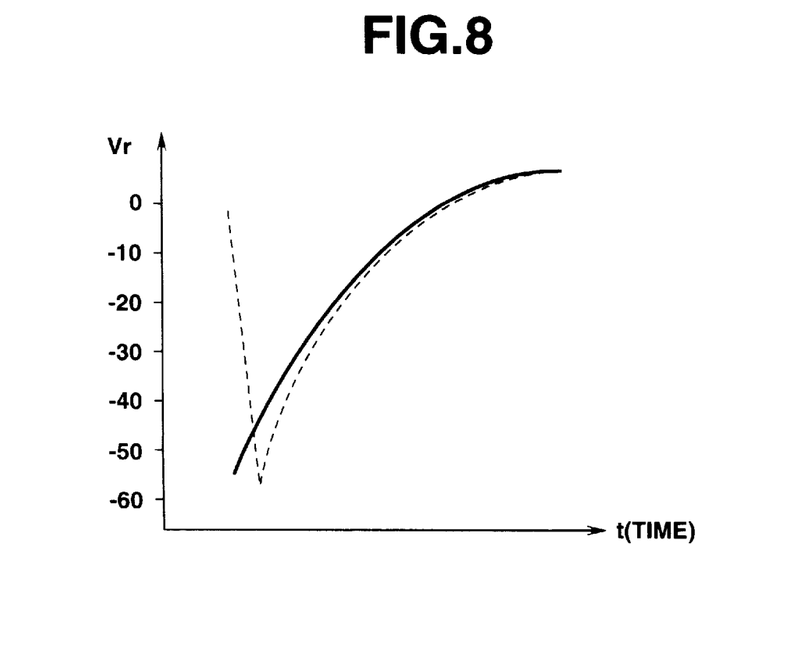
FIG. 8 is a characteristic graph representing a result of calculation of the relative velocity with no initial values of a relative velocity value and an inter-vehicle distance taken into consideration.

FIG. 8 shows a result of calculation on the band pass filter calculation for the inter-vehicle distance with no initial values of vr0 and lr0 of the relative velocity and the inter-vehicle distance taken into consideration.

As shown in FIG. 8, since the relative velocity calculated value (broken line) raises from zero, a large error occurs between an actual relative velocity (the solid line) immediately after the preceding vehicle has been recognized and the result of calculation (the broken line). Hence, if the result of calculation described with reference to FIG. 8 were used in the previously proposed follow-up run control apparatus, such as operation delay as a deceleration immediately after the preceding vehicle has been recognized occurs. In the case when the follow-up control to the new preceding vehicle is started, a disagreeable feeling is given to the vehicular occupant (s). The previously proposed automatic vehicular velocity control system described with reference to FIG. 8 is described in the U.S. Pat. No. 5,959,572.

The entire contents of Japanese Patent Applications Heisei 10-318913 (filed in Japan on Nov. 10, 1998) are incorporated herein by reference.

Although the present invention has been described by reference to certain embodiments described above, the present invention is not limited to the embodiments described above. Modifications and variations of the embodiments will occur to those skilled in the art in light of the above teachings.

The scope of the present invention is defined with reference to the following claims.

What is claimed is:

1. A relative velocity detecting apparatus for an automotive vehicle, comprising:
   an inter-vehicle distance detector, disposed on the vehicle so as to be oriented toward a forward detection zone of the vehicle to detect an inter-vehicle distance to a preceding vehicle which is running ahead of the vehicle, to recognize whether the preceding vehicle has entered the forward detection zone and to derive the inter-vehicle distance value lrn (n=1, 2, - - - , n) whenever a predetermined period of time has passed when recognizing that the preceding vehicle has entered the forward detection zone;
   a relative velocity calculator to perform a band pass filter calculation for the inter-vehicle distance value lrn, the band pass filter being expressed as:

$CF0 \cdot S/(S^2+CF1 \cdot S+CF0)$, wherein CF0 and CF1 denote constants and S denotes a differential operator, and to calculate a relative velocity value vr of the preceding vehicle to the vehicle according to the above equation; and
   an initial value setting section to set a first initial value lr0 of the inter-vehicle distance value and a second initial value vr0 of the relative velocity value in the band pass filter calculation by the relative velocity calculator during a run of the vehicle.

2. A relative velocity detecting apparatus for an automotive vehicle as claimed in claim 1, wherein the initial value setting section sets the inter-vehicle distance value lr1 at the predetermined period of time after the inter-vehicle distance detector has recognized that the preceding vehicle has entered the forward detection zone to the first initial value lr0 of the inter-vehicle distance value.

3. A relative velocity detecting apparatus for an automotive vehicle as claimed in claim 1, wherein the initial value setting section sets the second initial value vr0 of the relative velocity value from the following equation: vr0=(lr2−lr1)/ts, wherein ts denotes the predetermined period of time, lr2 denotes the inter-vehicle distance value at the subsequent predetermined period of time to the predetermined period of time at which the inter-vehicle distance value lr1 is detected and sets the first initial value lr0 of the inter-vehicle distance from the following equation: lr0=lr2−(CF1/CF0)·vr0.

4. A relative velocity detecting apparatus for an automotive vehicle as claimed in claim 1, wherein the initial value setting section includes a difference determinator to determine a difference between lr2 and lr1 and a selector to selectively set the first and second initial values of lr0 and vr0 of the inter-vehicle distance and the relative velocity according to a magnitude of difference from either the first initial value lr0 of the inter-vehicle distance set to the inter-vehicle distance value lr1 detected at the predetermined period of time after recognizing that the preceding vehicle has entered the forward detection zone and the second initial value lr1 of the relative velocity set from the following equation: vr0=(lr2−lr1)·(CF0/CF1), wherein lr2 denotes the inter-vehicle distance value at the subsequent predetermined period of time to the predetermined period of time at which the inter-vehicle distance value lr1 is detected, or the second initial value of the relative velocity set from the following equation: vr0=(lr2−lr1)/ts, wherein ts denotes the predetermined period of time, and the first initial value lr0 of the inter-vehicle distance set from the following equation: lr0=lr2−(CF1/CF0)vr0.

5. A relative velocity detecting apparatus for an automotive vehicle as claimed in claim 1, wherein the relative velocity detecting apparatus is installed in a system including: a vehicular velocity detector to detect a vehicular velocity of the vehicle; a preceding vehicle velocity calculator to add the calculated relative velocity value vr to the vehicular velocity to derive the vehicular velocity of the preceding vehicle; a target relative velocity calculator to calculate a target relative velocity which is used to make the inter-vehicle distance coincident with a target inter-vehicle distance, the target relative velocity calculator calculating the target relative velocity by using a form comprising a linear combination of, on one hand, a product of a first gain and a difference between the inter-vehicle distance and the target inter-vehicle distance and, on the other hand, a product of a second gain and the relative velocity; a target vehicular velocity calculating section to subtract the target relative velocity from the vehicular velocity of the preceding vehicle to calculate a target vehicular velocity of the vehicle; and a vehicular velocity controlling section to control the vehicular velocity of the vehicle so as to make the detected vehicular velocity of the vehicle coincident with the target vehicular velocity.

6. A relative velocity detecting apparatus for an automotive vehicle as claimed in claim 1, wherein the initial value setting section sets the first initial value lr0 of the inter-vehicle distance value and the second initial value vr0 of the relative velocity value in the band pass filter calculation by he relative velocity calculator at a time point at which the inter-vehicle distance detector recognizes that the preceding vehicle has entered the forward detection zone.

7. A relative velocity detecting apparatus for an automotive vehicle as claimed in claim 6, wherein the initial value setting section sets the second initial value vr0 of the relative velocity value to a value based on a deviation on the inter-vehicle distance value at the time point at which the inter-vehicle distance detector recognizes that the preceding vehicle has entered the forward detection zone and sets the first initial value lr0 of the inter-vehicle distance value to a value that accords with the second initial value vr0 of the relative velocity.

8. A relative velocity detecting apparatus for an automotive vehicle, comprising:

an inter-vehicle distance detector, disposed on the vehicle so as to be oriented toward a forward detection zone of the vehicle to detect an inter-vehicle distance to a preceding vehicle which is running ahead of the vehicle, to recognize whether the preceding vehicle has entered the forward detection zone and to derive the inter-vehicle distance value lrn (n=1, 2, - - - , n) whenever a predetermined period of time has passed when recognizing that the preceding vehicle has entered the forward detection zone;

a relative velocity calculator to perform a band pass filter calculation for the inter-vehicle distance value lrn, the band pass filter being expressed as:

$CF0 \cdot S/(S^2 + CF1 \cdot S + CF0)$, wherein CF0 and CF1 denote constants and S denotes a differential operator, and to calculate a relative velocity value vr of the preceding vehicle to the vehicle according to the above equation; and an initial value setting section to change a first initial value lr0 of the inter-vehicle distance value from null and to change a second initial value vr0 of the relative velocity value from null in the band pass filter calculation by the relative velocity calculator.

* * * * *